July 29, 1952
L. W. ROGERS
2,604,991
PORTABLE WATER PURIFIER
Filed Dec. 5, 1950
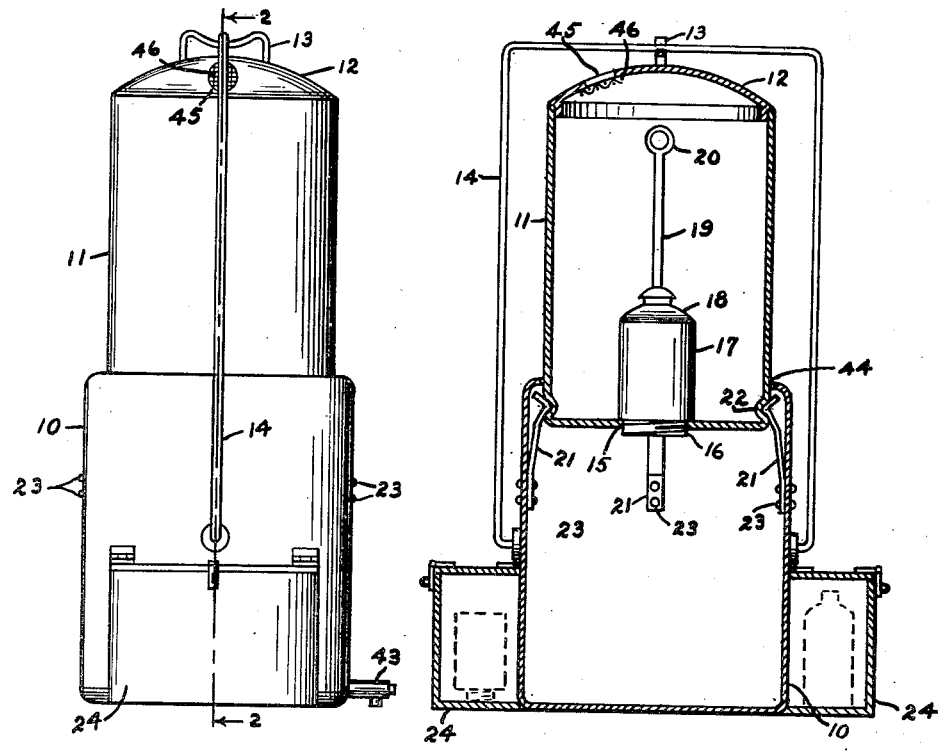
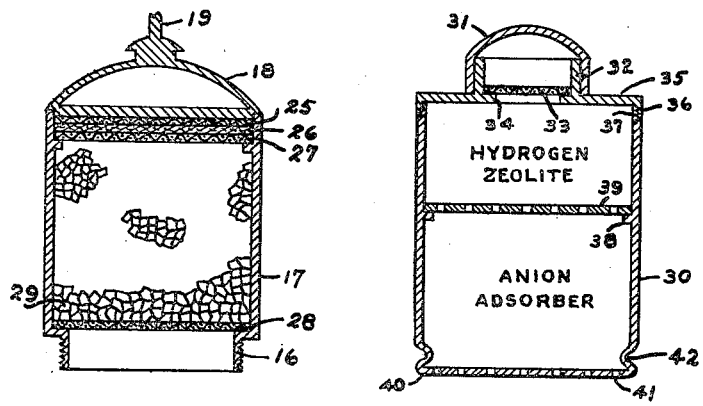
INVENTOR.
LODA W. ROGERS
BY
*J. B. Dickman, Jr.*
ATTORNEY.

Patented July 29, 1952

2,604,991

UNITED STATES PATENT OFFICE 2,604,991

PORTABLE WATER PURIFIER

Loda W. Rogers, West Lafayette, Ind.

Application December 5, 1950, Serial No. 199,276

2 Claims. (Cl. 210—122.2)

The present invention relates to a device for rendering sea water or other impure water drinkable and has special reference to a portable collapsible unit for this purpose.

A primary object of the present invention is the provision of a device of the character described which will be inexpensive to manufacture.

Another object of the present invention is the provision of a portable water purifying unit which is collapsible when not in use.

A still further object of the present invention is the provision of a portable water purifying device with changeable filtering units.

A still further object of the present invention is the provision of a portable water purifying device which will remove mud, silt and chemicals from impure water.

A still further object of the present invention is the provision of a water purifying device which will not corrode or be attacked by acids, chemicals, etc. and one that may easily be cleaned.

Other and further objects of the present invention will appear in the following specification and in the drawing, wherein:

Figure 1 is a front elevational view of the device showing it in its open position.

Figure 2 is a vertical cross sectional view of the device taken on line 2—2 of Figure 1.

Figure 3 is an enlarged vertical cross sectional view of the removable filter unit which is placed in the upper part of the device, a portion being shown broken.

Figure 4 is a vertical cross sectional view of an alternate upper container which is a filtering device.

Heretofore there have been quite a few devices proposed to effectively filter and purify water, both fresh and salt, but all of these devices to date have had disadvantages, such as bulkiness, expense, length of time required to purify the water, failure to effectively purify it, and devices that are subject to corrosion.

Referring to the drawing in detail numeral 10 represents the lower or storage container of the device in which pure liquid drops after purification. Telescopically mounted in relation to the storage container 10 is an upper filter container 11. The upper filter container is provided with a lid 12 having a bracket 13 mounted thereon or integral therewith, said bracket functioning as a handle for the unit.

Pivotally mounted on the storage container 10 is a bail 14 that serves as a handle and as a locking means. When the bail 14 is slipped over bracket 13 as shown in Figure 1, the storage container 10 is locked to the upper filter container 11, and the two containers can be carried and used in this position.

The upper filter container 11 has a centrally threaded opening 15 in its bottom wall, and this opening is adapted to receive the threaded portion 16 of a filter cartridge 17, the cartridge having a lid 18 to which is attached a longitudinal member 19, having a looped end 20 that forms a handle.

The upper filter container 11 is held in its extended position as shown in Figures 1 and 2 by means of spring arms 21 having one end of substantially V-shaped configuration that engages a groove or recess 22 that is provided in the wall of the container adjacent the bottom of said container. The spring arms 21 are secured to the wall of the container 10 by any suitable means such as rivets 23, welding etc.

Attached to the outside of the container 10 by any suitable means are storage chambers 24 that hold extra filter cartridges 17, and containers for tablets and other types of supplies, said tablets being Halazone and aluminum sulfate.

Filter cartridge 17 as shown in Figure 3 has mounted in the upper portion a screen 25, a coarse grain heavy duty filter paper 26 and another screen 27 all being supported by a flange, the filter 26 being interposed between screens 25 and 27. In the lower portion of the filter cartridge is another screen 28 that is of a very fine mesh. Between the screens 27 and 28, the container is filled with activated charcoal 29.

In Figure 4 there is shown an alternate type of upper filter unit 30 which replaces the upper container 11 when sea water is to be purified. Unit 30 has a cap 31 fitting over the mouth 32 of the unit. A screen 33 is placed in the mouth 32 and it rests on a flange or shoulder 34 of the top portion 35. The top portion 35 is provided with internal threads 36 that engage threads 37 on the upper end of the container or unit 30. Approximately midway on the inner peripheral wall of the unit or container 30 there is provided a flange 38 that supports a perforated disc 39. The bottom 40 of the unit or container 30 is provided with a plurality of perforations 41, the outer wall of the container adjacent the bottom being provided with a recess or groove 42 that is identical with the groove 22 in the container 11, and it is engaged by the V-shaped ends of the spring arms 21. Between the top portion 35 and the perforated disc 39 there is provided within this area a quantity of hydrogen zeolite, and below the perforated disc 39 there is provided a quantity of an anion adsorber. The lower portion of container 10 is provided with a spout 43 providing a means for removing purified water from the container.

In operation, the device is used as follows:

If sea water is to be purified, unit 30 is placed in position so that spring arms 21 engage groove 42 to support the unit in its extended position. The cap 31 is then removed and sea water poured into the mouth or opening 32 where the larger impurities are filtered out by screen 33. The salt water then passes through the hydrogen zeolite, removing calcium, magnesium and sodium cations, and leaving $H_2CO_3$, $H_2SO_4$ and $HCl$ to drip through perforated disc 39 which is the prerequisite for the anion adsorber which takes out anions when they are in the acid form. After the liquid passes through the anion adsorber it drips through the perforations 41 in bottom 40 and into the lower container 10 of the device. The water is now purified approximately the same as distilled water. It is free of sulphates, chlorides, calcium and magnesium and is substantially neutral as carbon dioxide is released through the space 44 between the upper end of container 10 and the lower end of container 40, the space 44 being shown in Figure 2.

If it is desired to filter any other type of water such as stagnant, muddy, or polluted water, filter unit 11 is used with filter cartridge 17 in the position as shown in Figure 2. The water to be purified is poured into opening 45 in the lid 12, where screen 46 filters out the larger particles of foreign matter. When the filter unit 11 is full, cover 12 is removed and one aluminum tablet and one Halazone tablet are added, and the water is stirred for 30 seconds. Then the mixture is allowed to stand for one-half hour. Handle 20 is then lifted up, removing the cover 18 from filter cartridge 17. Water will then filter through cartridge 17, and pass into the bottom container 10. This water is now pure and ready to drink, and it is released from container 10 through drain spout 43. These filter cartridges are discarded when they have lost their effectiveness and new ones substituted.

From the above description it can be seen that I have provided a water purifying device in which one container can be housed within the other container thus providing a compact portable device. It can also be seen that I have provided means on the device whereby containers containing supplies may be carried, the means being provided with hinged covers.

I am aware that changes may be made and details of construction varied without departing from the principles of this invention, and I therefore do not wish to limit myself to the exact showing, and that changes may be made without departing from the spirit of the invention or the claims hereto appended.

What is claimed is:

1. A water purifying device comprising cylindrical telescoping top and bottom vessels, said top vessel having a cover, a handle on said cover, said cover having an aperture, a screen over said aperture, an interchangeable filtering unit in said top vessel, a groove around the lower periphery of said top vessel, a plurality of vertical spring arms on the inner wall of said bottom vessel, said arms engaging the peripheral groove in the upper vessel, a bail on said lower vessel, said bail engaging with the handle on said cover to hold said cover on said top vessel and to act as a handle, said bottom vessel being of greater diameter than said top vessel, and having an inturned flange on its upper periphery covering said spring arms and creating a close fit between said top vessel and said bottom vessel.

2. The structure as set forth in claim 1, said filtering unit having a lid, a rod and a handle on said lid, a screen beneath said lid, filter paper beneath said screen, a second screen beneath said filter paper, activated charcoal below said second screen, a third screen at the bottom of said unit, threads on the exterior of the lower portion of said filtering unit, said upper container having a threaded aperture in its bottom wall for engagement with the threads on the filtering unit.

LODA W. ROGERS.

REFERENCES CITED

The following references are of record in the file of this patent:

UNITED STATES PATENTS

| Number | Name | Date |
|---|---|---|
| 388,347 | Dumont | Aug. 21, 1888 |
| 1,208,882 | Young | Dec. 19, 1916 |
| 1,386,340 | Wuster | Aug. 2, 1921 |
| 1,861,481 | Rabjohn | June 7, 1932 |
| 2,224,577 | Shively et al. | Dec. 10, 1940 |
| 2,404,967 | Levy | July 30, 1946 |
| 2,435,627 | Grandin et al. | Feb. 10, 1948 |
| 2,456,524 | Meincke, Jr. | Dec. 14, 1948 |
| 2,525,497 | Monfried | Oct. 10, 1950 |

FOREIGN PATENTS

| Number | Country | Date |
|---|---|---|
| 3,188 | Great Britain | 1895 |
| 17,363 | Germany | Mar. 10, 1881 |
| 330,000 | France | Sept. 9, 1903 |